United States Patent
Yoshizawa et al.

(10) Patent No.: US 7,582,392 B2
(45) Date of Patent: Sep. 1, 2009

(54) HOLOGRAM-RECORDING MATERIAL, HOLOGRAM-RECORDING MEDIUM, AND HOLOGRAM-RECORDING METHOD

(75) Inventors: Hisae Yoshizawa, Kanagawa (JP); Jiro Minabe, Kanagawa (JP); Yasuhiro Ogasawara, Kanagawa (JP); Katsunori Kawano, Kanagawa (JP); Kazuhiro Hayashi, Kanagawa (JP); Shin Yasuda, Kanagawa (JP); Koichi Haga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 249 days.

(21) Appl. No.: 11/546,958

(22) Filed: Oct. 13, 2006

(65) Prior Publication Data
US 2007/0117027 A1 May 24, 2007

(30) Foreign Application Priority Data
Nov. 22, 2005 (JP) ............................. 2005-337052
Aug. 11, 2006 (JP) ............................. 2006-219828

(51) Int. Cl.
*G03H 1/02* (2006.01)

(52) U.S. Cl. ............................. 430/1; 430/2; 430/280.1; 430/281.1; 430/20; 359/3; 359/4

(58) Field of Classification Search ........................ None
See application file for complete search history.

(56) References Cited

U.S. PATENT DOCUMENTS

| | | | |
|---|---|---|---|
| 2003/0191240 A1 | 10/2003 | Berneth et al. | |
| 2004/0166424 A1* | 8/2004 | Kaida et al. | 430/20 |
| 2004/0191684 A1* | 9/2004 | Maruyama et al. | 430/270.11 |
| 2005/0206984 A1* | 9/2005 | Kawano et al. | 359/8 |
| 2005/0208387 A1 | 9/2005 | Minabe et al. | |
| 2005/0228153 A1 | 10/2005 | Minabe et al. | |
| 2005/0265134 A1 | 12/2005 | Minabe et al. | |
| 2007/0117027 A1 | 5/2007 | Yoshizawa et al. | |
| 2008/0013138 A1* | 1/2008 | Yoshizawa et al. | 359/3 |
| 2008/0199782 A1* | 8/2008 | Yoshizawa et al. | 430/2 |

FOREIGN PATENT DOCUMENTS

| | | |
|---|---|---|
| DE | 19620588 | 11/1997 |
| JP | A-11-237612 | 8/1999 |
| JP | A-11-305036 | 11/1999 |
| JP | A-2002-265541 | 9/2002 |

(Continued)

OTHER PUBLICATIONS

Machine translation of JP 2005-115361.*

(Continued)

*Primary Examiner*—Martin J Angebranndt
(74) *Attorney, Agent, or Firm*—Oliff & Berridge, PLC

(57) ABSTRACT

A hologram-recording material, including a photoresponsive molecule, a reactive molecule having an intrinsic birefringence, and a photopolymerization initiator that accelerates polymerization and/or crosslinking of the reactive molecule having an intrinsic birefringence, a content of the photopolymerization initiator being in a range of less than about 0.1 wt % relative to the hologram-recording material, and, a content of the reactive molecule having an intrinsic birefringence being in a range of about 30 to about 80 wt % relative to the hologram-recording material.

17 Claims, 2 Drawing Sheets

FOREIGN PATENT DOCUMENTS

| JP | B2-3451319 | | 7/2003 |
|---|---|---|---|
| JP | A-2005-115361 | | 4/2005 |
| JP | A-2007-171916 | | 7/2007 |
| WO | 02/44801 | * | 6/2002 |

OTHER PUBLICATIONS

Yu et al., "Chiral nematic polymer mixture containing . . .", Adv. Funct. Mater., vol. 12(5) pp. 367-372 (May 2002).*

Yoshizawa et al., "Azopolymer/liquid crystal complex for polarization holograms," Jap. J. Appl. Phys., vol. 46(6B), pp. 3840-3844 (Jul. 2007 on-line).

Hvilsted et al., "Azobenzene side chain liquid crystalline polyesters with outstanding optical storage properties," Tr. J. Of Chem., vol. 22 pp. 33-45(1998).

Prescher et al., "Synthesis of liquid crystalline . . . ," J. Fluor. Chem., vol. 74 pp. 185-189 (1995).

Table 12.10ap°, the $5^{th}$ Edition Chemical Handbook Basic Book Ii, published by Maruzen Co., Ltd. edited by the Chemical Society of Japan, issued Feb. 20, 2004.

Helgert et al., "surface relief measurements in side chain azobenzene polyesters with different substituewnts," App!. Phys. B, vol. 72 pp. 429-433 (2001).

* cited by examiner

HOLOGRAM-RECORDING MATERIAL, HOLOGRAM-RECORDING MEDIUM, AND HOLOGRAM-RECORDING METHOD

BACKGROUND

1. Technical Field

The invention relates to a hologram-recording material using hologram recording suitable for large-capacity information recording, a hologram-recording medium using the same, and a hologram-recording method using the hologram-recording medium.

2. Related Art

In holographic data storage, it is possible to record polarized light by selecting polymeric materials having azobenzene skeletons in their molecules that change their orientation between trans and cis isomers by photoirradiation (hereinafter, sometimes referred to as "azopolymers") as the material for use in hologram recording.

Such polarized light recording allows incorporation of security keys and operations for data, just the sort of distinctive features of recording methods used for hologram recording. However, materials currently studied as recording materials for hologram-recording medium allowing recording of polarized light, such as azopolymers, are researched as rewritable materials, because the photoisomerization reaction occurring therein is reversible and the polarized light recording cannot be preserved for an extended period of time.

On the other hand, a large-volume of information can be recorded by the holographic data storage, and thus, there is a greater need for a write-once hologram-recording medium that will not loose the information once recorded, than for a rewritable hologram-recording medium.

Known hologram-recording media that satisfy such a need include those using photopolymerizable polymer recording materials (so-called photopolymers) that perform recording by using an irreversible reaction, polymerization, caused by photoirradiation. However, such media cannot be used for polarized light recording and do not have the advantages described above. It also has a disadvantage that deterioration in sensitivity becomes more distinctive, as multiple recording is carried out during multiplex recording.

In contrast, there are many known optical recording media using photochromic materials, such as azopolymers, in which photoisomerization reactions occur by photoirradiation.

However, such media is not capable of fixing (preserving) of the information once recorded, and thus, cannot be used as a write-once optical recording medium, because the information previously recorded is lost when it is overwritten with new information.

On the other hand, control of the orientation of molecules such as photochromic materials having an azobenzene skeleton in the field of hologram recording is also important in other fields, such as liquid crystal displays and optical filters, and various research is being undertaken.

However, as described above, there is still no write-once optical recording medium allowing multiplex recording by using polarized light, with high sensitivity during recording, and also, superior in the efficiency of fixing information once recorded.

SUMMARY

According to an aspect of the invention, there is provided a hologram-recording material, including a photoresponsive molecule, a reactive molecule having an intrinsic birefringence, and a photopolymerization initiator that accelerates polymerization and/or crosslinking of the reactive molecule having an intrinsic birefringence, a content of the photopolymerization initiator being in a range of less than about 0.1 wt % relative to the hologram-recording material, and a content of the reactive molecule having an intrinsic birefringence being in a range of about 30 to about 80 wt % relative to the hologram-recording material.

BRIEF DESCRIPTION OF THE DRAWINGS

Exemplary embodiments of the present invention will be described in detail based on the following figures, wherein.

DETAILED DESCRIPTION

Figure 1:
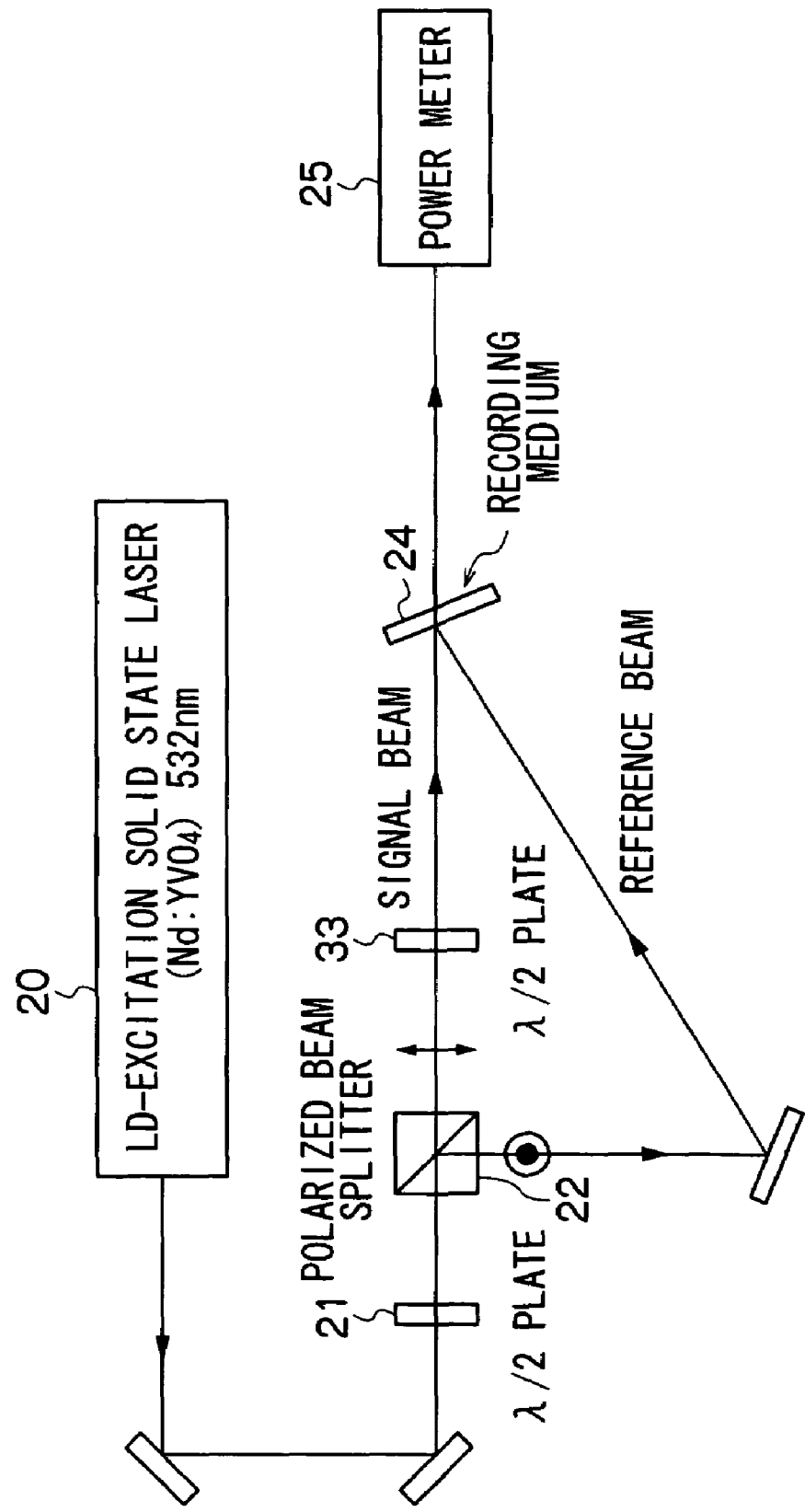
FIG. 1 is a schematic chart illustrating a photorecording-reproducing device for use in an aspect of the invention.

The inventors conducted the following studies. First, it would be effective to use, not a recording material that can be polymerized by irradiation of light such as a photopolymer, but a material that changes its molecular orientation (or partial region of the molecule) such as an azopolymer that shows trans-cis isomerization by photoirradiation (hereinafter, referred to as "photoresponsive molecule") for recording of polarized light. In addition, the physical state in the region of recording layer where the light for information recording is irradiated is preferably preserved as it is, for assuring favorable information-fixing efficiency.

It would be preferable from the points above to fix the orientation state of a photoresponsive molecule such as azopolymer, for example by polymerization, after the orientation state is established, as shown in JP-A Nos. 11-237612, 2002-265541, and 11-305036 the disclosures of which are incorporated by reference herein, and others. However, the amount of the unpolymerized photoresponsive molecule present in the photoirradiated region of recording layer decreases after each recording, and therefore, the sensitivity of the layer also declines during multiplex recording. It may be possible to use a method of increasing the density of the photoresponsive molecule in the recording layer or to increase the thickness of the recording layer to overcome the problem, but increase in the amount of the photoresponsive molecule absorbing light leads to deterioration in the efficiency of using light.

As shown in Japanese Patent No. 3451319, it is advantageous to use an azopolymer and a liquid crystalline molecule in combination, for the purpose of simply increasing sensitivity during recording. Thus, it is possible to raise sensitivity without deterioration in the light utilization efficiency, by using a component (azopolymer) orienting itself in direct response to light irradiation and a component (liquid crystalline molecule) orienting itself secondarily with the orientation of the directly orienting component in combination. Such a high sensitivity is obtained, because the sensitivity inherent to the azopolymer is amplified by the liquid crystalline molecule orienting itself with the azopolymer. However, the recorded information can not be fixed in such a case.

In view of the circumstances described above, the inventors considered that it is possible to blend, in a recording layer, a component mainly aimed at assuring sensitivity with a component mainly aimed at assuring the fixing efficiency of information once fixed, for assuring sensitivity as well as information-fixing efficiency, even during multiplex recording by using polarized light, and completed the invention.

<Hologram-Recording Material and Hologram-Recording Medium>

The hologram-recording material according to an aspect of the invention (hereinafter, referred to briefly as "recording material") includes a photoresponsive molecule, a reactive molecule having an intrinsic birefringence, and a photopolymerization initiator that accelerates polymerization and/or crosslinking of the reactive molecule having an intrinsic birefringence. The content of the photopolymerization initiator is in the range of less than 0.1 wt % relative to the hologram-recording material, and the content of the reactive molecule having an intrinsic birefringence is in the range of 30 to 80 wt % relative to the hologram-recording material. The hologram-recording medium (hereinafter, sometimes referred to briefly as "recording medium") according to an aspect of the invention includes a recording layer that is the recording material according to an aspect of the invention.

Information recording on the recording material according to an aspect of the invention may be performed by simultaneous irradiation of signal and reference beams, and the information recording may be performed by multiplex recording using modulation of polarization direction of light However, the information may be recorded by using modulation of amplitude or phase, instead of modulation in the polarization direction. When the information is recorded by using modulation in the polarization direction, the information recording material of an aspect of the present invention is capable of information recording corresponding to when the polarization directions of the signal and reference beams are in parallel with each other ("intensity-modulated hologram") and also is capable of information recording corresponding to when the polarization directions of the signal and reference beams are perpendicular to each other ("polarization-modulated hologram).

The "reactive molecule having an intrinsic birefringence" means a molecule that is polymerized and/or crosslinked by photoirradiation, i.e., a molecule that is polymerized and/or crosslinked by a photopolymerization initiator contained in the hologram-recording material, when a light to which the photoresponsive molecule is sensitive is irradiated. The reactive molecule will be described below in detail.

Information recording and fixing by using the recording material according to an aspect of the invention proceed in the following process. First, the photoresponsive molecule contained in the recording layer orients itself in photoisomerization reaction in a particular direction, when a light (polarized light) causing photoisomerization reaction of the photoresponsive molecule is irradiated. Then, the reactive molecule having an intrinsic birefringence present around the photoresponsive molecule orients itself in an orientation state in accordance with that of the photoresponsive molecule.

The reactive molecule having an intrinsic birefringence then initiates polymerization and/or crosslinking reaction, when a light at a wavelength identical with that of the light irradiated on the photoresponsive molecule is irradiated on the reactive molecule having an intrinsic birefringence in the orientation state in accordance with that of the photoresponsive molecule. Thus, the orientation state of the reactive molecule having an intrinsic birefringence in the orientation state in accordance with that of the photoresponsive molecule is fixed, and consequently, the information once recorded is fixed.

Because new information is fixed by irradiation of a new polarized light at each information recording during multiplex recording, the amount of the unpolymerized reactive molecule having an intrinsic birefringence contained in the recording layer decreases after each recording. For that reason, the amount of the unreacted reactive molecule having an intrinsic birefringence that can orient itself along the orientation of the photoresponsive molecule decreases after each information recording, and the function of the liquid crystalline molecule amplifying sensitivity similar to the recording medium shown in Japanese Patent No. 3451319 declines.

However, because the amount of the photoresponsive molecule for use in the next recording contained in the recording layer may be kept constant always during multiplex information recording, the sensitivity of the recording medium according to an aspect of the invention may also be kept at the certain level corresponding to the amount of the photoresponsive molecule present in the recording layer.

Accordingly, the recording medium according to an aspect of the invention may, not only allows fixing of information, but also retains its sensitivity at a level higher than that of the recording medium using a conventional photopolymer, even during multiplex information recording.

As described above, in an aspect of the invention, the reactive molecule having an intrinsic birefringence plays a role of fixing recorded information, while the photoresponsive molecule plays roles of inducing orientation of the reactive molecule having an intrinsic birefringence and assuring the sensitivity during multiplex recording. It is thus possible to perform multiplex recording at high sensitivity by using polarized light and also to fix information once recorded.

As described above, in an aspect of the invention, the reactive molecule having an intrinsic birefringence is polymerized or crosslinked by irradiation of light during information recording. Accordingly, it is possible to perform information recording and fixing substantially at the same time, and also it is possible to simplify the configuration of hologram-recording device for recording and reproducing information, by using the hologram-recording medium.

Also in an aspect of the invention, the recording layer contains a photopolymerization initiator for acceleration of polymerization and/or crosslinking of the reactive molecule having an intrinsic birefringence used in recording layer by photoirradiation.

The content of the photopolymerization initiator in the recording layer (i.e., in recording material) should be 0.1 wt % or less, but may be 0.08 wt % or less. A photopolymerization initiator content of 0.1 wt % or more leads to polymerization and/or crosslinking of the reactive molecule having an intrinsic birefringence before orientation along with the photoresponsive component as will be described below, consequently prohibiting reliable recording. Alternatively, an excessively smaller content of the photopolymerization initiator may lead to deterioration in information-fixing efficiency, and thus, the content of the photopolymerization initiator may be 0.001 wt % or more with respect to the reactive molecule.

Normally, the amount of the photopolymerization initiator is preferably greater, for rapid recording and fixing of information. For that reason, the photopolymerization initiator may be contained in an amount of several wt %.

However, the information recording and fixing in an aspect of the invention proceeds by, by photoirradiation, (1) first orientation of the photoresponsive molecule, (2) subsequent orientation of the reactive molecule having an intrinsic birefringence along with orientation of the photoresponsive molecule, and (3) final polymerization and/or crosslinking of the reactive molecule having an intrinsic birefringence in the oriented state. However, practically in the three-phase reaction, the reaction does not proceed sequentially from the processes (1) and (2), to process (3), and it seems that the process (3) is also in progress competitively to some extent in the phase of processes (1) and (2). Thus, when the competition between the process (3) and the processes (1) and (2) are remarkable, i.e., when the reaction rate of process (3) is relatively larger than the reaction rates of processes (1) and (2), the reactive molecule having an intrinsic birefringence may be polymerized and/or crosslinked (information fixing) before sufficient orientation of the reactive molecule having an intrinsic birefringence (before completion of information recording).

In particular when the photoresponsive molecule is a polymer larger in molecular size and smaller in molecular mobility as will be described below, the reaction rate of the process (1) becomes relatively smaller, and the reaction rate of the process (2) also declines accordingly, raising the problem above more distinctively.

Focusing on the points, the inventors considered that it would be possible to polymerize and/or crosslink the reactive molecule having an intrinsic birefringence in a state in which the reactive molecule having an intrinsic birefringence has been sufficiently orientated and thus to perform recording at high sensitivity, by lowering the competition between the processes (1) and (2) and the process (3), specifically by making the reaction rate of the process (3) relatively smaller than the reaction rate of the processes (1) and (2). The factor primarily governing the reaction rate of the process (3) seems to be the content of the photopolymerization initiator. On the basis of the findings above, the inventors have found that it is possible to perform high-sensitivity recording by reducing the content of the photopolymerization initiator to less than 0.1 wt %.

In addition, the content of the reactive molecule having an intrinsic birefringence in the recording layer (i.e., in recording material) should be in the range of 30 to 80 wt %, and may be in the range of 35 to 65 wt %.

A content of the reactive molecule having an intrinsic birefringence at less than 30 wt % leads to deterioration in recording density, consequently prohibiting high sensitivity during multiplex recording. Alternatively, a content of more than 80 wt % leads to deterioration in sensitivity because of insufficient content of the photoresponsive molecule.

—Configuration of Hologram-Recording Medium—

Hereinafter, the configuration of the recording medium according to an aspect of the invention and the materials used therein will be described in detail.

The recording medium according to an aspect the invention include at least a recording layer that is a recording material containing the photoresponsive molecule, the reactive molecule having an intrinsic birefringence, and the photopolymerization initiator described above, and the recording layer may be formed on a substrate (or base material). A reflective layer may be formed between the recording layer and the substrate. A protective layer protecting the recording layer may also be formed on the face of the recording layer opposite to the face provided with substrate. The protective layer may be the substrate (i.e., recording layer may be held between a pair of substrates). In addition, an intermediate layer may be formed as needed for assuring adhesion of the substrate with the reflective or recording layer, or adhesion between the reflective, recording, and protective layers. Further, an antireflective coat may be formed as needed, for example, on the surface of the protective layer.

The holographic recording medium may be in any selected shape such as a disc shape, a sheet shape, a tape shape, and a drum shape, as long as the recording layer is two-dimensionally formed with a constant thickness.

However, a disc shape having a hole at its center (as used for conventional optical recording media) may be applicable, because existing manufacturing technology for optical recording media and existing recording/reproduction systems can easily be applied.

(Recording Layer)

The recording layer is made of the hologram-recording material according to an aspect of the invention containing a photoresponsive molecule, a reactive molecule having an intrinsic birefringence, and a photopolymerization initiator as essential components, and other components as needed. Examples of the other components for use include binder and others that are not directly involved in information recording/reproduction.

The thickness of the recording layer is practically, preferably in the range of 3 $\mu$m to 2 mm, but, when the recording medium according to an aspect of the invention is used for plane hologram, the film thickness is preferably in the range of 3 to 100 $\mu$m, more preferably in the range of 5 to 20 $\mu$m. On the other hand, when the recording medium according to an aspect of the invention is used for volume hologram, the film thickness is preferably in the range of 100 $\mu$m to 2 mm, more preferably in the range of 250 $\mu$m to 1 mm.

Hereinafter, each component contained in the recording layer will be described in detail.

—Photoresponsive Molecule—

The photoresponsive molecule may be a material that has a partial structure capable of causing isomerization (such as cis-trans isomerism and syn-anti isomerism) by the irradiation of light and causes a change in orientations of molecules by the isomerization of the partial structure.

In an aspect of the invention, the photoresponsive molecule may have an azobenzene skeleton (a structure including an azo group and benzene rings provided at both ends of the azo group) capable of causing cis-trans isomerization by the irradiation of light. Such cis-trans isomerization of an azobenzene skeleton is shown as Isomerization Example 1 below.

Isomerization Example 1

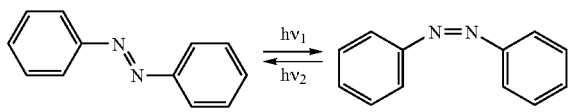

In the case where a photoresponsive molecule is a polymer material (photoresponsive polymer), the photoisomerizable group (which refers to a group that causes an isomerization reaction by the irradiation of light) having an azobenzene skeleton or the like may be contained in its side chain moiety. Such a polymer material can be designed in various ways with respect to its main and side chain structures, respectively, and thus has a merit that not only its absorption coefficient but also its various physical properties necessary for holographic recording, such as its sensitive wavelength range, its speed of response and its record retention properties can easily be controlled to the desired values at a high level.

In addition to the photoisomerizable group, for example, a liquid-crystalline linear mesogenic group such as a biphenyl derivative may be introduced into the side chain. In such a case, the change in the orientation of the photoisomerizable group by the irradiation of light can be enhanced or fixed so that the loss in absorption can be suppressed.

Examples of the polymer material having the azobenzene skeleton or the like include the polymer materials disclosed in JP-A Nos. 2005-331763, 2005-300680, 2005-345652, 2005-274628, 2005-266610, 2005-316278, 2005-316279, and 2005-266603, the disclosures of which are incorporated by reference herein.

As one example of the photoresponsive molecule usable in an aspect of the invention, one example of a structural formula of a polymer having a photoisomerizable group having an azobenzene skeleton or the like in its side chain moiety (hereinafter, referred to as "azopolymer (1)" in some cases) is described below. In the structural formula, n represents an integer of 1 or more.

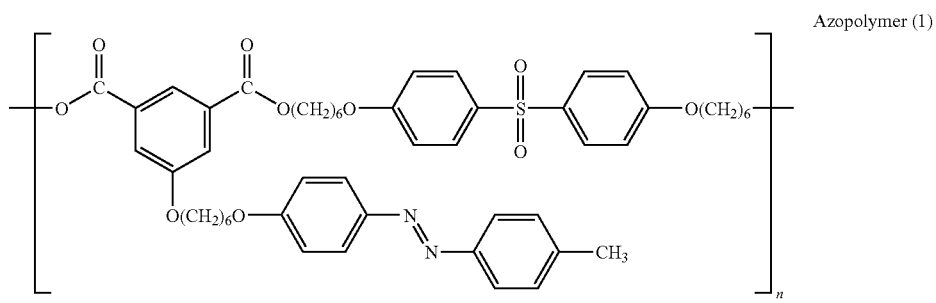

Azopolymer (1)

Besides the azobenzene skeleton-containing materials, diarylethene type materials may be used as the photoresponsive molecule. Diarylethenes can exhibit photochromism. Such photochromism is a 6π-electron ring reaction in which the conversion is caused only by light similarly to fulgide or the like. Diarylethenes may be classified as a type of stilbene. The photochromism of the diarylethenes is cis-trans isomerization and characterized in that its thermal stability and repeat durability are high. The chemical structural formula of a typical diarylethene and an example of its isomerization reaction (Isomerization Example 2) are shown below.

Isomerization Example 2

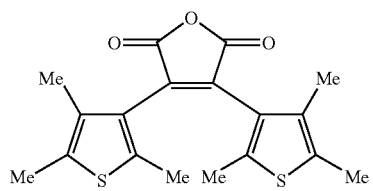 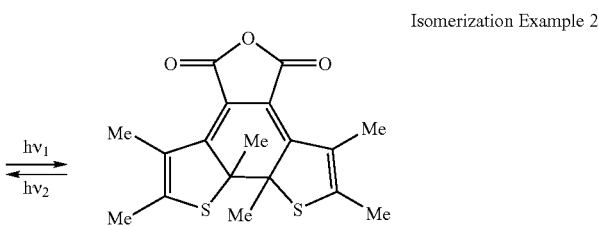

For example, the holographic recording medium may have a recording layer formed from a material including a dispersion of diarylethene in polyvinyl alcohol (PVA), polymethylmethacrylate (PMMA) or the like. The recording layer of this holographic recording medium becomes colorless by the irradiation of light of about 500 nm in wavelength and forms color by the irradiation of light of about 360 nm in wavelength. Holographic recording can be performed using such a change in absorption.

Spiropyran type materials may also be used as the photoresponsive molecule. Spiropyrans are the mostly researched and reported photochromic compounds. Some of the spiropyrans are in the actual use, and the spiropyrans are one of the most promising compounds. The chemical structural formula of a typical spiropyran and an example of its isomerization reaction (Isomerization Example 3) are shown below.

Fulgide type materials may also be used as the photoresponsive molecule. The chemical structural formula of a typical fulgide and an example of its isomerization reaction (Isomerization Example 5) are shown below. Fulgide forms color by the irradiation of ultraviolet light with a wavelength

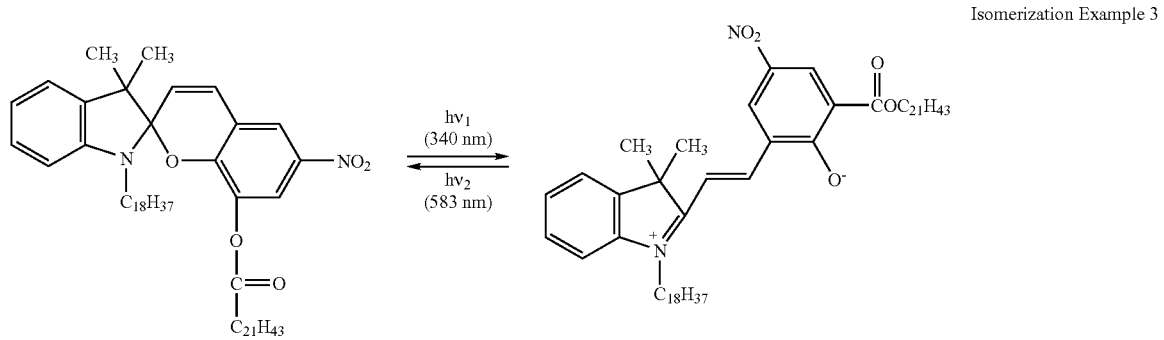

Isomerization Example 3

Spiropyrans shows a blue color by the irradiation of light and can produce good contrast. Spiropyran-containing polymer materials are typically characterized in that: ultraviolet light can turn them from colorless to colored; the coloring speed is high; and the color is slowly fading when they are allowed to stand in a dark place. The spiropyrans with such characteristics may be used as the photoresponsive molecule for the holographic recording medium of an aspect of the invention.

Other examples thereof include xanthene dyes such as uranine, Erythrosine B and Eosine Y The chemical structural formula of a typical xanthene dye, uranine, and an example of its isomerization reaction (Isomerization Example 4) are shown below. If a xanthene dye is used, recording of information on a holographic recording medium can be performed even with a relatively low-intensity light beam. When the holographic recording medium is produced with the xanthene dye, a material including a dispersion of the xanthene dye in PVA, PMMA or the like may be used.

of 365 nm and is isomerized by the irradiation of green light with a wavelength of 515 nm or 532 nm. Thus, such characteristics may be applied to the holographic recording medium.

Isomerization Example 5

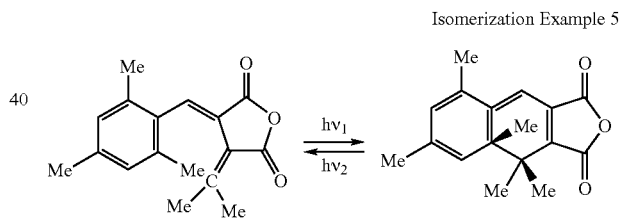

Photochromic compound-containing polymer materials other than the azobenzene skeleton-bearing materials may also be used as the photoresponsive molecule in an aspect of Isomerization Example 4

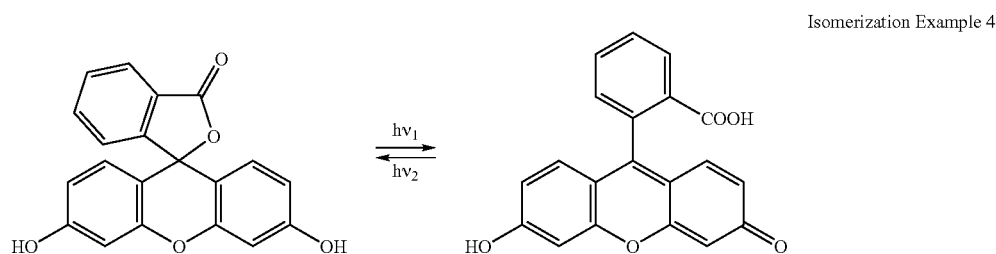

the invention. Examples of such other photoresponsive molecules include the materials disclosed in JP-A No. 2005-266608, the disclosure of which is incorporated by reference herein. Examples of other photoresponsive molecules include the materials disclosed in JP-A No. 2005-275273, the disclosure of which is incorporated by reference herein.

—Reactive Molecule Having an Intrinsic Birefringence—

A compound that is polymerized and/or crosslinked by photoirradiation is used as the reactive molecule having an intrinsic birefringence, as described above.

The reactive molecule having an intrinsic birefringence for use in an aspect of the invention may be a molecule having a refractive index (Ne) in the major-axis direction different from the refractive index (No) in the minor-axis direction. The intrinsic birefringence means a birefringence intrinsic to a molecule, and can be determined from bulk birefringence in the solid or liquid crystal state and also by molecular orbital calculation. Because information recording on the hologram-recording medium using the hologram-recording material according to an aspect of the invention is performed by using refractive modulation, the refractive anisotropy $\Delta N = |Ne - No|$ of the reactive molecule having an intrinsic birefringence is preferably greater, specifically, preferably 0.01 or more, more preferably 0.05 or more, and still more preferably 0.1 or more.

Thus, the reactive molecule having an intrinsic birefringence for use in an aspect of the invention may be a rod-shaped molecule having conjugation extending over a long distance in the molecular axial direction.

The reactive molecule having an intrinsic birefringence may be a reactive liquid crystalline molecule described below, but is not limited thereto, and may be, for example, a so-called dichromatic compound (colorant) having a reactive group in the molecule. Hereinafter, the reactive liquid crystalline molecule will be described more in detail.

The reactive liquid crystalline molecule is a liquid crystalline compound having a skeleton showing nematic, cholesteric or smectic liquid crystal orientation, and having at least one unsaturated double bond such as acryloyl, methacryloyl, or vinyl, or polymerizable functional group such as epoxy group at the terminal. A reactive liquid crystalline molecule crosslinkable with two or more polymerizable functional groups may also be used. In such a case, the molecular orientation can be fixed more tightly.

Examples of the cyclic units serving as a mesogenic group for liquid crystal orientation include biphenyl derivatives, phenylbenzoate derivatives, phenylcyclohexane derivatives, phenylpyrimidine derivatives, diphenyl acetylene derivatives, diphenylbenzoate derivatives, bicyclohexane derivatives, cyclohexylbenzene derivatives, terphenyl derivatives, and the like. The terminal of the cyclic unit may be substituted, for example, with a substituent group such as cyano, alkyl, alkoxy, or halogen. The reactive liquid crystalline molecules used for the recording material may be used alone or in combination of two or more. The reactive liquid crystalline molecule is normally subjected to orientation treatment and then crosslinked and/or polymerized by a suitable method, for example by heating or light irradiation, to give a polymer.

—Photopolymerization Initiator—

A photopolymerization initiator is used in an aspect of the invention, for acceleration of polymerization and/or crosslinking of the reactive molecule having an intrinsic birefringence contained in the recording layer that is the recording material. In an embodiment, the photopolymerization initiator may absorb light at one or more wavelengths in the range of 340 to 650 nm.

Examples of the photopolymerization initiators for use include common photopolymerization initiators including acetophenone derivatives such as 2,2-diethoxyacetophenone, benzoin derivatives, benzophenone derivatives, thioxanthone derivatives, diazonium derivatives, sulfonium salt derivatives, iodonium salt derivatives, and selenium salt derivatives. The photopolymerization initiator may be soluble in or compatible with the reactive molecule having an intrinsic birefringence or the photoresponsive molecule, for reducing the influence by light scattering. The photopolymerization initiator may be transparent. Examples thereof include IRGACURE 784, IRGACURE 184, IRGACURE 651, and IRGACURE 369 manufactured by Ciba Specialty Chemicals, and the like.

A sensitizer may be added to the recording material in addition to the photopolymerization initiator in the range that does not impair the advantages of an aspect of the invention. The amount of the photopolymerization initiator added to the recording material according to an aspect of the invention is generally 0.001 to 10 wt %, preferably in the range of 0.1 to 5 wt % of the reactive molecule having an intrinsic birefringence.

—Other Components (Binder and Others)—

If necessary, other components such as a binder resin may be used in the recording material contained in the recording layer.

Polymethylmethacrylate (PMMA) having good optical properties or polyvinyl alcohol (PVA) may be used as the binder resin. The polyester material having cyanobiphenyl in its side chain, as represented by Structural Formula (1) below, may also be used as the binder resin.

Structural Formula (1)

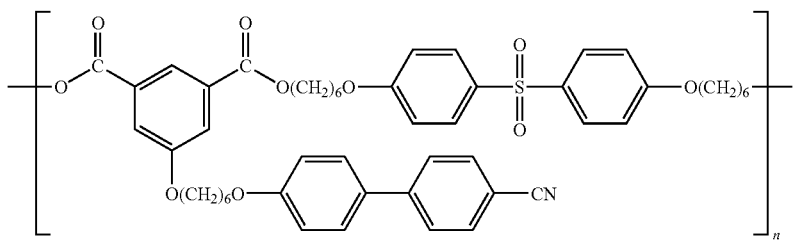

In the structural formula (1), n represents an integer of 1 or more. This polyester material has transparency in the wavelength range of light generally used for recording/reproducing information on/from a holographic recording medium. This polyester material may be used in combination with the photoresponsive polymer having a photoisomerizable group. In such a case, birefringence can be induced by the isomerization of the photoisomerizable group, and therefore, the sensitivity of the photoresponsive polymer can effectively be increased. The term "combination" refers to not only physical mixing of the photoresponsive polymer having the photoisomerizable group and the polyester represented by Structural Formula (1) but also chemical mixing of them, that is, a case where the repeating unit represented by Structural Formula (1) is contained in the photoresponsive polymer having the photoisomerizable group (to form a copolymer).

—Formation of the Recording Layer—

In order to form the recording layer, a known method can be appropriately used in accordance with a recording material of an aspect of the invention used as the material for the recording layer. For example, the following method can be used: a liquid phase method of using a coating liquid in which the recording material of an aspect of the invention is dissolved, such as spraying, spin coating, dipping, roll coating, blade coating, doctor rolling, or screen printing method; vapor deposition; or the like. Further, a plate-shaped recording layer (thick film) can be formed by using injection molding or hot press.

(Substrate/Base Plate)

Any material may be selected and used as the substrate or the base plate, as long as it has a smooth surface. For example, metals, ceramics, resins, paper, and the like may be used. It may also be in any shape. A disc-shaped flat substrate having a hole at its center (as used for conventional optical recording media) may be used, because existing manufacturing technology for optical recording media and existing recording/reproduction systems can easily be applied.

Specific examples of materials for such a substrate include glass, polycarbonate, acrylic resin such as polymethylmethacrylate, vinyl chloride resin such as polyvinyl chloride and vinyl chloride copolymer, epoxy resin, amorphous polyolefin, polyester, and metals such as aluminum. If desired, any of these materials may be used in combination.

In terms of resistance to moisture, dimensional stability and low cost, amorphous polyolefin and polycarbonate may be used, or polycarbonate may be particularly used.

In general, on a surface of a substrate are formed guide grooves for tracking or irregularities (pregroove) representing information such as address signals.

In a case where light for recording or reproduction will be irradiated to the recording layer through a substrate, the substrate should transmit light in the range of the wavelength of the irradiated light (a recording light and a reproducing light). In this case, the transmittance may be 90% or more in the range of the wavelength of the irradiated light (around the wavelength having a maximum intensity in the case of a laser beam).

In the process of forming a reflective layer on the substrate surface, an undercoat layer may be formed on the substrate surface for the purpose of improving flatness and adhesion strength.

Examples of the material for the undercoat layer include a polymer material such as polymethylmethacrylate, acrylic acid-methacrylic acid copolymer, styrene-maleic anhydride copolymer, polyvinyl alcohol, N-methylolacrylamide, styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, polycarbonate; and a surface modifying agent such as a silane coupling agent.

The undercoat layer may be formed by a process including the steps of dissolving or dispersing any of the above materials in an appropriate solvent to prepare a coating liquid and applying the coating liquid to the substrate surface by such a coating method as spin coating, dip coating and extrusion coating. In general, the thickness of the undercoat layer is preferably from 0.005 μm to 20 μm, and more preferably, from 0.01 μm to 10 μm.

(Reflective Layer)

The reflective layer may be made of a light-reflecting material having a reflectance of at least 70% with respect to a laser beam. Examples of such a light-reflecting material include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi; and stainless steels.

One of these light-reflecting materials may be used alone, or two or more of these materials may be combined and used, for example in the form of an alloy. Cr, Ni, Pt, Cu, Ag, Au, Al, and stainless steels are preferable. Au, Ag, Al, and any alloy thereof are more preferable. Au, Ag and any alloy thereof are still more preferable.

For example, the reflective layer may be formed on the substrate by vapor deposition, sputtering or ion-plating of any of the above light-reflecting materials. In general, the thickness of the reflective layer may be from 10 nm to 300 nm, or from 50 nm to 200 nm.

(Protective Layer)

Any known material may be used to form the protective layer, as long as it has a thickness and is made of a material so as to protect the recording layer mechanically, physically and chemically under normal use conditions. For example, a transparent resin or a transparent inorganic material such as $SiO_2$ may be used for the protective layer.

In a case where light for recording or reproduction is irradiated to the recording layer through a protective layer, the protective layer should be made of a material that transmits light in the range of the wavelength of the irradiated light. In this case, the transmittance may be 90% or more with respect to the range of the wavelength of the irradiated light (around the wavelength having a maximum intensity in the case of a laser beam). The same applies to an intermediate layer which may be provided on or above the recording layer surface to which light is irradiated for the purpose of improving adhesion or the like.

The protective layer may be made of a resin. In such a case, a resin film including polycarbonate or cellulose triacetate previously shaped into a sheet may be used and bonded onto the recording layer to form the protective layer. The bonding process may include the steps of bonding the film with a thermosetting or UV-curable adhesive for ensuring adhesion strength and curing the adhesive by heat treatment or UV irradiation. While the resin film for use as the protective layer may have any thickness as long as it can protect the recording layer, it preferably has a thickness of 30 μm to 200 μm, and more preferably 50 μm to 150 μm, in terms of practical use.

Alternatively, a thermoplastic resin, a thermosetting resin, or a photo-setting resin may be applied in place of the resin film in order to form the protective layer. Further, antireflective coating may be applied on the protective layer as desired.

The protective layer may be made of a transparent ceramic material such as $SiO_2$, $MgF_2$, $SnO_2$, and $Si_3N_4$ or a glass material. In such a case, the protective layer may be formed by a sputtering method or a sol-gel method. While the protective layer of the transparent inorganic material may have any thickness as long as it can protect the recording layer, it preferably has a thickness of 0.1 μm to 100 μm, and more preferably 1 μm to 20 μm, in terms of practical use.

(Process for Producing the Recording Medium)

A description is provided below of a process for producing the holographic recording medium configured as described above according to an aspect of the invention.

The holographic recording medium for plane hologram according to an aspect of the invention may be manufactured by sequentially laminating the recording layer and any other layer on the substrate depending on the material for each layer. A brief description is provided below of an example of the main flow of a process of manufacturing the holographic recording medium including a recording layer and a protective layer each provided on a substrate.

First, a recording layer having a desired film thickness is formed on a polycarbonate substrate by spin coating, by using a coating solution obtained by dissolving in a solvent a polymeric photoresponsive molecule, a reactive molecule having an intrinsic birefringence, a photopolymerization initiator, and other components added as needed, and dried sufficiently. Then, a hologram-recording medium in the configuration of protective layer/recording layer/substrate is prepared by bonding the recording layer to a cellulose triacetate resin film for forming a protective layer with a double-faced adhesive tape.

In a case where the holographic recording medium of an aspect of the invention is for a volume hologram, its recording layer can be formed by injection molding and hot press as long as the reactive molecule is not thermally polymerized. Specifically, the holographic recording medium can be produced as follows.

In a case where injection molding is used, the holographic recording medium may be manufactured as follows. First, injection molding is performed to form a disc-shaped material for use as a recording layer. The disc-shaped material is then sandwiched between a pair of disc-shaped transparent substrates, and they are laminated by hot press and bonded with a hot melt adhesive.

In the process of injection molding, a starting material resin (a resin containing at least a photoresponsive molecule, a reactive molecule having an intrinsic birefringence and a photopolymerization initiator) is heated and melted, and the melted resin is injected into a molding die and molded into the form of a disc. The injection molding machine may be any of an inline type injection molder having a material-plasticizing function and an injection function integrated with each other and a pre-plunger type injection molder having a plasticizing function and an injection function separated from each other. The injection molding may be performed under the conditions of an injection pressure of 1000 to 3000 kg/cm$^2$ and an injection speed of 5 to 30 mm/sec.

In the hot press process, the plate-shaped material produced by the injection molding process is sandwiched between a pair of transparent disc-shaped substrates, and they are hot-pressed under vacuum.

In the holographic recording medium prepared as described above, the recording layer is not a film formed on the substrate but a film separately formed by injection molding. Such a recording layer can easily be made thick, and such a holographic recording medium is suited for mass production. In addition, the residual strain of the injection-molded material is made uniform in the process of laminating the recording layer and the transparent substrate by hot press. Even if a thick recording layer is produced, therefore, the recording characteristics will not be degraded by the effect of light absorption or scattering.

In a case where hot press is used, for example, the holographic recording medium may be prepared as follows. A powdered resin (a resin containing at least a photoresponsive molecule, a reactive molecule having an intrinsic birefringence and a photopolymerization initiator) is sandwiched between highly-releasable substrates (pressing members) such as TEFRON® sheets and hot-pressed under vacuum in this state to form a recording layer directly.

In the hot press process, vacuum hot press may be performed. In such a case, a powdered resin material is packed between a pair of pressing members. The pressure is then reduced to about 0.1 MPa for the purpose of preventing bubbles from forming, while the material is gradually heated to a specific temperature and pressed through the pressing members. In this process, the heating temperature may be at least the glass transition temperature (Tg) of the resin material, and the pressing pressure may be from 0.01 to 0.1 t/cm$^2$. After the hot press is performed for a given time period, the heating and the pressing are stopped, and the material is cooled to room temperature and then taken out.

When the hot press is performed, the resin material sandwiched between the pair of pressing members is heated and melted, and the melt is cooled to form a plate-shaped recording layer. Finally, the pressing members are removed so that an optical recording medium is obtained. For example, when the recording layer is produced with an azopolymer, which has a low Tg of about 50° C., the polymer is heated to about 70° C. and hot-pressed so that the recording layer can easily be formed with the desired thickness. The hot press does not cause residual strain.

If desired, a protective layer or the like may be formed for the purpose of increasing the damage or humidity resistance of the holographic recording medium including this recording layer.

In the holographic recording medium prepared as described above, the recording layer is not a film formed on the substrate but a film separately formed by hot press. Such a recording layer can easily be made thick. In addition, the recording layer shaped by hot press can be free from residual strain or the like. Even if a thick recording layer is produced, therefore, the recording characteristics will not be degraded by the effect of light absorption or scattering. If the reactive molecule initiates polymerization reaction by heat, the medium is prepared by injection or molding only under pressure.

<Hologram-Recording Method>

Hereinafter, the hologram-recording method using the hologram-recording medium will be described. In the hologram-recording method according to an aspect of the invention, information is recorded on the recoding layer of the recoding medium and the information once recorded is reproduced by photoirradiation of the recording medium according to an aspect of the invention. In an aspect of the invention, the information recording may be multiplex recording by using polarized light. In such a case, it is possible to perform multiplex recording at high sensitivity and fix the information once recorded. In addition, use of polarized light may allow incorporation of security keys and operations for the recorded data.

Hereinafter, the photorecording-reproducing device recording and/or reproducing information by using the hologram-recording medium according to an aspect of the invention described above will be described. The photorecording-reproducing device for use in an aspect of the invention may have any configuration of known recording/reproduction methods such as hologram recording and absorbance-modulated recording, according to the specification of the hologram-recording medium used in record reproduction. In particular, the photorecording-reproducing device for use in an aspect of the invention may have a configuration of hologram recording using polarized light.

In such a case, the photorecording-reproducing device for use in an aspect of the invention may have at least a signal beam source irradiating a signal beam corresponding to information onto a hologram-recording medium during information recording and a reference beam source irradiating a reference beam on the hologram-recording medium during reproduction (read out) of the information recorded on the hologram-recording medium. In addition, the device may have a read out sensor (for example, CCD, etc.), for example using a photoelectric conversion element, reading the information reproduced by irradiation of the reference beam on the hologram-recording medium (reproduced or diffracted beam). Further, the device used only for recording or reproduction may be configured as needed, by eliminating the signal beam source, or eliminating the reference beam source and the read out sensor.

Normally, various optical systems commonly used in optical record reproducing devices may also be applied thereto. For example, there may be formed an image-forming optical system irradiating a signal beam on a hologram-recording medium by using a mirror, a beam splitter, a lens, and the like, or signal and reference beams may be taken from the same light source, for example by using a beam splitter.

The light source of the signal beam and/or the reference beam is not particularly limited, and a known laser beam source such as He—Ne laser or Ar laser is normally used. A light source having a bright-line spectrum with a small spectral half-value width of approximately 2 to 3 nm, such as ultrahigh-pressure mercury lamp, may be used, instead of completely monochromatic light such as laser; or alternatively, a white light source such as sunlight or an electric lamp may also be used.

When the hologram-recording medium used is a so-called disk-shaped medium such as commercially available DVD or CD-ROM, the device may have other various mechanisms suitable for the disk medium used for example in DVD or CD-ROM, i.e., mechanism such as motor holding and rotating a disk and mechanism of irradiating signal and reference beams at a predetermined position in the disk plane direction (e.g., galvanomirror when the light source is fixed, so-called head allowing scanning of the light source in the disk plane direction).

Examples of the hologram recording modes include hologram recording allowing multiple hologram recording on a single site by changing the angle of the incident light with respect to the recording surface, hologram recording allowing multiple hologram recording in a single region by changing the position of the incident light on the recording surface, and the like.

Hereinafter, an example of the photorecording-reproducing device for use in an aspect of the invention will be described, with reference to drawings. As shown in FIG. 1, a beam at 532 nm from a laser diode-excited solid state laser (Nd:YVO$_4$) 20 is used for recording and reproduction. The linearly polarized light emitted from the solid state laser is rotated by a half-wave plate 21, and the light is divided by a polarized beam splitter 22 into two beams, signal and reference beams. It is possible then to control the balance of the two beams by adjusting the rotation angle of the polarized light. These two beams cross each other in the recording medium (optical recording medium) 24, and induce optical anisotropy in the recording medium 24 according to the intensity distribution or polarization distribution caused by interference by the two beams. The half-wave plate 33 in signal-beam optical path controls polarization of the signal beam, and it is thus possible to obtain intensity-modulated hologram in which the polarization directions of the signal and reference beams are in parallel with each other, or polarization-modulated hologram in which the polarization directions thereof are perpendicular to each other.

During reproduction, it is possible to obtain a diffracted beam by the recorded information by irradiating only the reference beam on the optical recording medium, and to determine the optical output with a power meter 25. It is thus possible to calculate the diffraction efficiency of the optical recording medium, by determining the ratio of the diffraction light intensity to the intensity of the reference beam.

In the photorecording-reproducing device for use in an aspect of the invention, information can be recorded and reproduced by using the recording medium according to an aspect of the invention as the recording medium 24. If a recording medium containing, for example, an azopolymer as the photoresponsive molecule is used, it is possible to record an intensity-modulated hologram in which the polarization directions of the signal and reference beams are in parallel and also a polarization-modulated hologram in which the polarization directions are perpendicular, by adjusting the half-wave plate 33 and the polarized beam splitter 22.

EXAMPLES

Hereinafter, an aspect of the invention will be described in detail with reference to Examples, but it should be understood that the invention is not limited to the following Examples.

<Preparation of Recording Medium>:

Comparative Example A1

Preparation of Recording Medium A1

A chloroform solution containing 60 parts by weight of the azopolymer (1) described above (weight-average molecular weight: 23,000) and 40 parts by weight of a liquid crystalline molecule (4'-pentyl-4-cyanobiphenyl) is coated by spin coating and dried on a washed disk-shaped glass substrate (diameter: 50 mm, thickness: 1 mm), forming a recording layer having a thickness of 2 μm, to give a recording medium A1.

Comparative Example A2

Preparation of Recording Medium A2

A photopolymer film (OMNIMAX, manufactured by Du Pont, film thickness: 35 μm) is bonded on one face of a washed disk-shaped glass substrate (diameter: 50 mm, thickness: 1 mm), forming a recording layer, to give a recording medium 2.

Example A1

Preparation of Recording Medium A3

A THF (tetrahydrofuran) solution containing 60 parts by weight of the azopolymer (1) (weight-average molecular weight: 23,000), 40 parts by weight of a reactive liquid crystal monomer (UCL 008, manufactured by Dainippon Ink and Chemicals, Inc.), and 0.004 part by weight of a photopolymerization initiator (IRGACURE 784, manufactured by Ciba Specialty Chemicals) is coated by spin coating and dried on one face of a washed disk-shaped glass substrate (diameter: 50 mm, thickness: 1 mm), forming a recoding layer having a thickness of 2 μm, to give a recording medium A3.

<Evaluation of Sensitivity Change During Multiplex Recording>

—Evaluation Apparatus—

Figure 2:
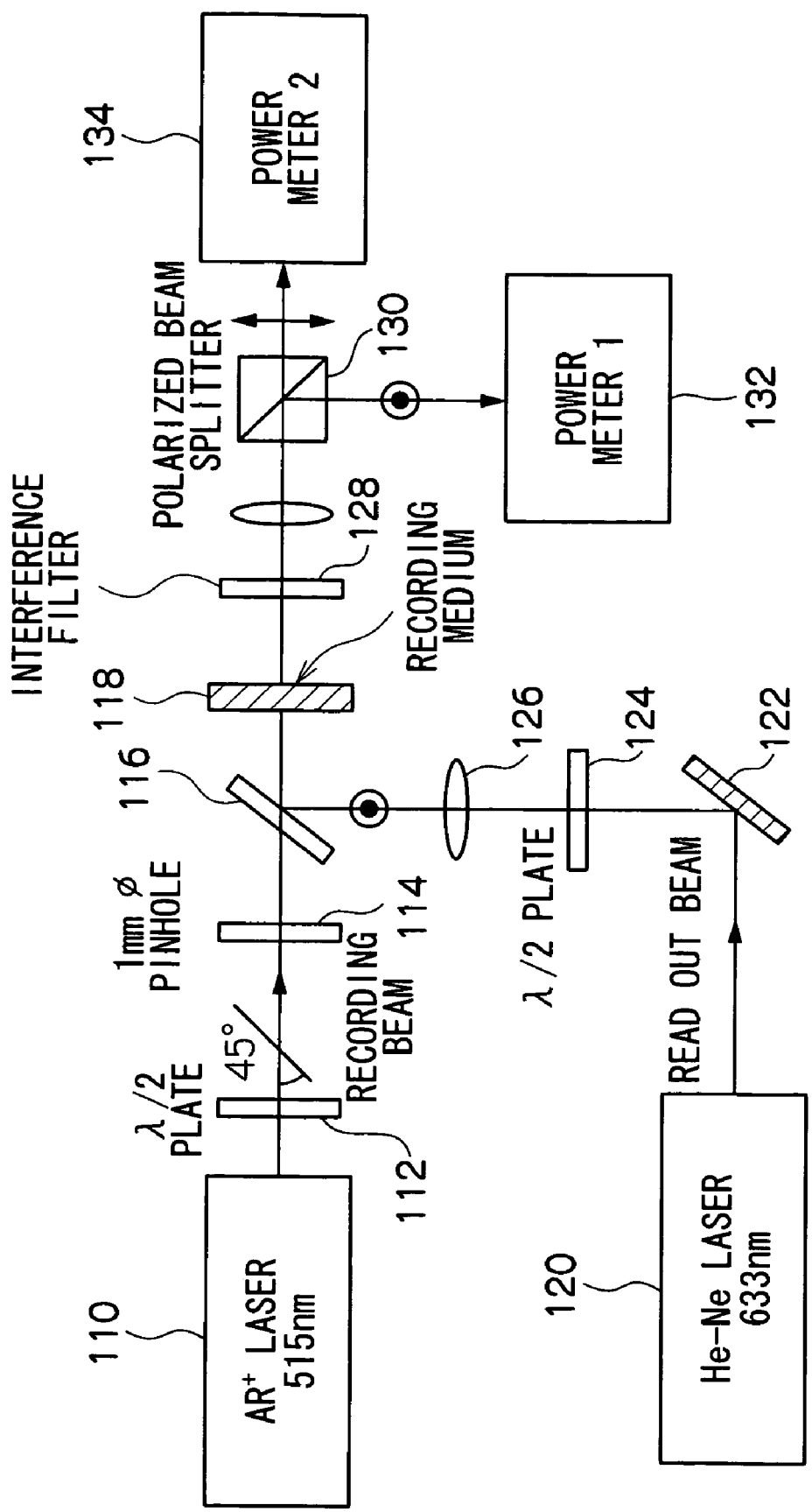
FIG. 2 is a schematic chart illustrating the optical system used for evaluation of the recording medium.

The sensitivity of the recording media A1 and A3 is determined as the rate of energy-dependent change, by measuring the birefringence generated by irradiation of linearly polarized light in the optical system shown in FIG. 2. FIG. 2 is a schematic view illustrating the optical system used in evaluating the birefringence of the recording medium. In FIG. 2, 110 represents an argon-ion laser (wavelength: 515 nm), 112 represents a half-wave plate; 114 represents a pinhole (diameter: 1 mm); 116 represents a half mirror; 118 represents a recording medium; 120 represents a helium-neon laser (wavelength: 633 nm); 122 represents a mirror; 124 represents a half-wave plate; 126 represents a lens; 128 represents an interference lens; 130 represents a polarized beam splitter; and 132 and 134 each represents power meters.

The measurement of the optical recording medium 118 in the optical system shown in FIG. 2 is performed as follows. First, as a recording beam, a linearly polarized light at a wavelength of 515 nm sensitive to the azopolymer (1) and the photopolymerization initiator contained in the recording layer of the recording medium 118 is irradiated on the recording medium 118, from the argon-ion laser 110 via the half-wave plate 112, the pinhole 114, and the half mirror 116.

Separately, as a probe beam, a linearly polarized light at a wavelength of 633 nm is irradiated on the recording medium 118 so as to form an angle of 45 degrees with respect to the polarization axis, from the helium-neon laser 120, via the mirror 122, the half-wave plate 124, the lens 126, and the half mirror 116. The laser beam outgoing from the recording medium 118 passes through the interference filter 128, and is divided into polarized light components having polarization directions perpendicular to each other by the polarized beam splitter 130, and the optical outputs thereof are respectively measured in the two power meters 132 and 134. The change in birefringence is calculated from the polarization state of transmitted beam by using the value measured by the two power meters 132 and 134.

—Evaluation of Recording Media 1 and 3—

A polarized light from an argon laser (wavelength: 515 nm) is irradiated on the recording medium and at the same time, a He—Ne laser beam (wavelength: 633 nm) having a polarization direction of 45 degrees with respect to the argon-laser polarization direction is irradiated on the recording medium. The change in birefringence is calculated by detecting the change in the polarization state of the He—Ne laser beam before and after transmission through the recording medium by using the measurements by power meter. The sensitivity is determined as an initial change in birefringence when the beam is irradiated (change in birefringence 50 seconds after initiation of irradiation). Then, after rotation of the sample by 45 degrees, the second sensitivity is determined by irradiating the laser beam and the birefringence is obtained.

The sensitivity during multiplex recording is evaluated by first irradiating a laser beam at two irradiation intensities, high and low, while altering the irradiation period; irradiating the laser again after rotation of the sample by 45 degrees; and measuring the birefringence.

—When Laser Beam is Irradiated at High Intensity (High Multiplex Recording)—

An argon laser beam at an output of 0.5 W/cm$^2$ polarized by 45 degrees with respect to a He—Ne laser beam that is a probe beam irradiated simultaneously with the argon laser beam is irradiated for 600 seconds. The birefringence reached almost equilibrium after irradiation for 600 seconds. The rate of increase in birefringence during the period for 50 seconds after initiation of the first irradiation is determined, as the standard value (100) of sensitivity. Then, after rotation of the sample by 45 degrees, the second irradiation is performed for 200 seconds; and the rate of increase in birefringence during the period for 50 seconds after initiation of irradiation is determined as the sensitivity, to calculate a relative sensitivity with respect to the standard value.

—When Laser Beam is Irradiated at Low Intensity (Low Multiplex Recording)—

Then, after altering the position of the recording medium so that the laser beam is irradiated at a position different from that when the laser beam is irradiated at high intensity, an argon laser beam at an output of 0.5 W/cm$_2$ polarized by 45 degrees with respect to a He—Ne laser beam that is a probe beam irradiated simultaneously with the argon laser beam is irradiated for 200 seconds (the exposure period is set to approximately ⅓ of that when the laser beam is irradiated at high intensity). The birefringence does not reach equilibrium after irradiation for 200 seconds. The rate of increase in birefringence during the period for 50 seconds after initiation of the first irradiation is determined as the standard value (100) of sensitivity. Then, after rotation of the sample by 45 degrees, the second irradiation is performed for 200 seconds; and the rate of increase in birefringence during the period for 50 seconds after initiation of irradiation is determined as the sensitivity, to calculate a relative sensitivity with respect to the standard value.

—Evaluation of Recording Medium A2—

Because the recording medium A2 does not permit recording with polarized light, the initial energy-dependent change in diffraction efficiency of the argon laser beam (515 nm) is determined, instead of birefringence, as the sensitivity by using the optical system shown in FIG. 1 (the solid state laser at a wavelength of 532 nm in the optical system shown in FIG. 1 is replaced with an Ar laser as the light source). The recording medium 2 is evaluated similarly to the recording media 1 and 3 at two laser-beam irradiation intensities, high and low. The diffraction efficiency is determined as a ratio of the diffraction light intensity to the intensity of the reference beam irradiated onto the recording medium.

The sensitivity thus obtained, i.e., a relative value of the second sensitivity of the second photoirradiation to the first sensitivity 100 of the first photoirradiation, is shown in Table 1.

TABLE 1

| | | Change in sensitivity during multiplex recording | | | |
|---|---|---|---|---|---|
| | | Laser irradiation intensity: high | | Laser irradiation intensity: low | |
| | | First sensitivity | Second sensitivity | First sensitivity | Second sensitivity |
| Comparative Example A1 | Recording medium A1 | 100 | 100 | 100 | 100 |
| Comparative Example A2 | Recording medium A2 | 100 | 10 | 100 | 60 |
| Example A1 | Recording medium A3 | 100 | 75 | 100 | 119 |

The sensitivity of the recording medium 2 using a photopolymer as the recording material and the recording medium 3 using an azopolymer (1) and a reactive liquid crystal monomer as the recording materials declines as the number of recording increases, because the recorded information is fixed thereon.

However, in contrast to the recording medium 2 of which the sensitivity declines as the number of recording increases, the decline in sensitivity of the recording medium 3 associated with the increase in the number of recording is smaller, and it is found that it is possible to obtain high sensitivity even after high multiplex recording.

The sensitivity of the recording medium 1 using an azopolymer (1) and a liquid crystalline molecule as the recording materials remains always constant, independently of the number of recording, because the recorded information cannot be fixed.

<Evaluation of Information Fixing Efficiency>

Information is recorded on each of the recording media A1 to A3 by irradiation of a polarized light from an argon laser (wavelength: 515 nm, intensity: 0.5 W/cm$_2$) in an optical system similar to that for evaluation of the sensitivity change described above. A circularly polarized light is then irradiated through a quarter-wave plate installed to the incident-beam side of the recording medium, for evaluation of the fixing efficiency of information once recorded (dispersion stability). Then, the diffraction efficiency or birefringence after irradiation of polarized light and those after irradiation of circularly polarized light are determined.

Relative values of the birefringence or diffraction efficiency after irradiation of circularly polarized light, with respect to 100 of the birefringence or the diffraction efficiency after irradiation of polarized light (after information recording), are shown in the following Table 2.

TABLE 2

| | | Birefringence or diffraction efficiency (relative value) | |
|---|---|---|---|
| | | After irradiation of polarized light (after information recording) | After irradiation of circularly polarized light |
| Comparative Example A1 | Recording medium A1 | 100 | 10 |
| Comparative Example A2 | Recording medium A2 | 100 | 100 |
| Example A1 | Recording medium A3 | 100 | 60 |

After irradiation with circularly polarized light, the recording medium A1 has a birefringence of 10. It seems that, when a photoisomerizable group including the azo group of azopolymer (1) is irradiated with a circularly polarized light that randomizes the orientation thereof, liquid crystalline molecules oriented in a certain direction by irradiation of polarized light become almost isotropic in accordance with the photoisomerizable group, and the orientation thereof is disturbed.

In contrast, in the recording medium A2 using only a photopolymerizable photopolymer as the recording material, there is no change in diffraction efficiency before and after irradiation of circularly polarized light because the photopolymer is already hardened, and it is found that information is fixed during irradiation of the polarized light.

On the other hand, it is shown that the birefringence declines to 60 but the information is fixed in recording medium A3 by irradiation of circularly polarized light. It seems that, even if a circularly polarized light disturbing the orientation of the photoisomerizable group including the azo group of azopolymer (1) is irradiated, the reactive liquid crystal monomer oriented in a certain direction remains anisotropic after irradiation of circularly polarized light, because the orientation is fixed by polymerization.

<Evaluation of the Influence by the Amount of Polymerization Initiator>

Example B1

Azopolymer (1) (weight-average molecular weight: 23,000): 45 parts by weight

Reactive liquid crystal monomer (UCL 008, manufactured by Dainippon Ink and Chemicals): 55 parts by weight Photopolymerization initiator (IRGACURE 784, manufactured by Ciba Specialty Chemicals): 0.055 part by weight A THF (tetrahydrofuran) solution containing the components above is coated by spin coating and dried on one face of a washed disk-shaped glass substrate (diameter: 50 mm, thickness: 1 mm), forming a recording layer having a thickness of 2 μm, to give a recording medium.

Example B2

Azopolymer (1) (weight-average molecular weight: 23,000): 60 parts by weight

Reactive liquid crystal monomer (UCL 008, manufactured by Dainippon Ink and Chemicals): 40 parts by weight Photopolymerization initiator (IRGACURE 784, manufactured by Ciba Specialty Chemicals): 0.04 part by weight A THF (tetrahydrofuran) solution containing the components above is coated by spin coating and dried on one face of a washed disk-shaped glass substrate (diameter: 50 mm, thickness: 1 mm), forming a recording layer having a thickness of 2 μm, to give a recording medium.

Example B3

Azopolymer (1) (weight-average molecular weight: 23,000): 60 parts by weight

Reactive liquid crystal monomer (UCL 008, manufactured by Dainippon Ink and Chemicals): 40 parts by weight Photopolymerization initiator (IRGACURE 784, manufactured by Ciba Specialty Chemicals): 0.08 part by weight A THF (tetrahydrofuran) solution containing the components above is coated by spin coating and dried on one face of a washed disk-shaped glass substrate (diameter: 50 mm, thickness: 1 mm), forming a recording layer having a thickness of 2 μm, to give a recording medium.

Comparative Example B 1

Azopolymer (1) (weight-average molecular weight: 23,000): 80 parts by weight

Reactive liquid crystal monomer (UCL 008, manufactured by Dainippon Ink and Chemicals): 20 parts by weight Photopolymerization initiator (IRGACURE 784, manufactured by Ciba Specialty Chemicals): 0.02 part by weight A THF (tetrahydrofuran) solution containing the components above is coated by spin coating and dried on one face of a washed disk-shaped glass substrate (diameter: 50 mm, thickness: 1 mm), forming a recording layer having a thickness of 2 μm, to give a recording medium.

Comparative Example B2

Azopolymer (1) (weight-average molecular weight: 23,000): 60 parts by weight
Reactive liquid crystal monomer (UCL 008, manufactured by Dainippon Ink and Chemicals): 40 parts by weight
Photopolymerization initiator (IRGACURE 784, manufactured by Ciba Specialty Chemicals): 3.8 parts by weight A THF (tetrahydrofuran) solution containing the components above is coated by spin coating and dried on one face of a washed disk-shaped glass substrate (diameter: 50 mm, thickness: 1 mm), forming a recording layer having a thickness of 2 μm, to give a recording medium.

Comparative Example B3

Azopolymer (1) (weight-average molecular weight: 23,000): 60 parts by weight
Reactive liquid crystal monomer (UCL 008, manufactured by Dainippon Ink and Chemicals): 40 parts by weight
Photopolymerization initiator (IRGACURE 784, manufactured by Ciba Specialty Chemicals): 0.2 part by weight A THF (tetrahydrofuran) solution containing the components above is coated by spin coating and dried on one face of a washed disk-shaped glass substrate (diameter: 50 mm, thickness: 1 mm), forming a recording layer having a thickness of 2 μm, to give a recording medium.

Comparative Example B4

Azopolymer (1) (weight-average molecular weight: 23,000): 15 parts by weight
Reactive liquid crystal monomer (UCL 008, manufactured by Dainippon Ink and Chemicals): 85 parts by weight
Photopolymerization initiator (IRGACURE 784, manufactured by Ciba Specialty Chemicals): 0.085 part by weight A THF (tetrahydrofuran) solution containing the components above is coated by spin coating and dried on one face of a washed disk-shaped glass substrate (diameter: 50 mm, thickness: 1 mm), forming a recording layer having a thickness of 2 μm, to give a recording medium.

—Evaluation—

Then, information is recorded on each of the recording media above by irradiating a polarized light from an argon laser (wavelength: 515 nm, intensity: 0.5 W/cm$_2$) until the birefringence becomes saturated (for 600 seconds), by using an optical system similar to that used in evaluation of the sensitivity change (birefringence) described above, and subsequently, a circularly polarized light from an argon laser (wavelength: 515 nm, intensity: 0.5 W/cm$_2$) is irradiated for 1,200 seconds at the same position.

Then, the birefringence at saturation (maximum birefringence) during information recording and the birefringence after irradiation of circularly polarized light (determined approximately 200 seconds after termination of circularly polarized light irradiation) are evaluated. Results are shown in the following Table 3.

TABLE 3

| | Content of photopolymerization initiator in recording layer (wt %) | Content of reactive liquid crystalline molecule in recording layer (wt %) | Content ratio of photopolymerization initiator to reactive liquid crystalline molecule (wt %) | Maximum birefringence A | Birefringence B after circularly polarized light | Record-fixing rate B/A (%) |
|---|---|---|---|---|---|---|
| Example B1 | 0.055 | 55 | 0.1 | 0.05 | 0.025 | 50 |
| Example B2 | 0.04 | 40 | 0.1 | 0.07 | 0.045 | 64 |
| Example B3 | 0.08 | 40 | 0.2 | 0.07 | 0.03 | 43 |
| Comparative Example B1 | 0.02 | 20 | 0.1 | 0.005 | 0 | 0 |
| Comparative Example B2 | 3.8 | 40 | 10 | 0.035 | 0.01 | 29 |
| Comparative Example B3 | 0.2 | 40 | 0.5 | 0.05 | 0.017 | 33 |
| Comparative Example B4 | 0.085 | 85 | 0.1 | 0.005 | 0.001 | 20 |

The foregoing description of the embodiments of an aspect of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A hologram-recording material, comprising:
    a photoresponsive molecule,
    a reactive molecule having an intrinsic birefringence, and
    a photopolymerization initiator that accelerates polymerization and/or crosslinking of the reactive molecule having an intrinsic birefringence,
        a content of the photopolymerization initiator being in a range of from 0.001 wt % to less than about 0.1 wt % relative to the hologram-recording material, and being in a range of from 0.1 wt % to 5 wt % relative to the reactive molecule, and
        a content of the reactive molecule having an intrinsic birefringence being in a range of about 30 to about 80 wt % relative to the hologram-recording material.

2. The hologram-recording material of claim 1, wherein the photopolymerization initiator absorbs light at one or more wavelengths in the range of 340 to 650 nm.

3. The hologram-recording material of claim 1, wherein the photoresponsive molecule is a photoresponsive polymer.

4. The hologram-recording material of claim 3, wherein the photoresponsive polymer has an azobenzene skeleton.

5. The hologram-recording material of claim 1, wherein the content of the reactive molecule having an intrinsic birefringence is in a range of about 35 to about 65 wt % relative to the hologram-recording material.

6. The hologram-recording material of claim 1, wherein, when information is recorded by simultaneous irradiation of signal and reference beams, the material is capable of information recording corresponding to when the polarization directions of the signal and reference beams are in parallel with each other and is capable of information recording corresponding to when the polarization directions of the signal and reference beams are perpendicular to each other.

7. The hologram-recording material of claim 1, wherein, when information is recorded by simultaneous irradiation of signal and reference beams, the material is capable of recording of the information by using modulation of at least one selected from the amplitude, phase, or polarization direction of light.

8. A hologram-recording medium, comprising:
a recording layer that comprises:
a hologram-recording material including a photoresponsive molecule,
a reactive molecule having an intrinsic birefringence, and
a photopolymerization initiator that accelerates polymerization and/or crosslinking of the reactive molecule having an intrinsic birefringence,
a content of the photopolymerization initiator being in a range of from 0.001 wt % to less than about 0.1 wt % relative to the hologram-recording material, and being in a range of from 0.1 wt % to 5 wt % relative to the reactive molecule, and
a content of the reactive molecule having an intrinsic birefringence being in a range of about 30 to about 80 wt % relative to the hologram-recording material.

9. The hologram-recording medium of claim 8, wherein the photopolymerization initiator has an absorption wavelength in a range of about 340 to about 650 nm.

10. The hologram-recording medium of claim 8, wherein the photoresponsive molecule is a photoresponsive polymer.

11. The hologram-recording medium of claim 10, wherein the photoresponsive polymer has an azobenzene skeleton.

12. The hologram-recording medium of claim 8, wherein the content of the reactive molecule having an intrinsic birefringence is in a range of about 35 to about 65 wt % relative to the hologram-recording material.

13. A hologram-recording method, comprising:
performing multiplex recording of information by using at least one of light intensity modulation or polarized light modulation during recording of the information by simultaneous irradiation of signal and reference beams on a hologram-recording medium that includes:
a recording layer that is a hologram-recording material containing:
a photoresponsive molecule,
a reactive molecule having an intrinsic birefringence, and
a photopolymerization initiator that accelerates polymerization and/or crosslinking of the reactive molecule having an intrinsic birefringence,
a content of the photopolymerization initiator being in a range of from 0.001 wt % to less than about 0.1 wt % relative to the reactive hologram-recording material, and being in a range of from 0.1 wt % to 5 wt % relative to the reactive molecule, and
a content of the reactive molecule having an intrinsic birefringence being in a range of about 30 to about 80 wt % relative to the hologram-recording material.

14. The hologram-recording method of claim 13, wherein the photopolymerization initiator has absorption in a range of about 340 to about 650 nm.

15. The hologram-recording method of claim 13, wherein the photoresponsive molecule is a photoresponsive polymer.

16. The hologram-recording method of claim 15, wherein the photoresponsive polymer has an azobenzene skeleton.

17. The hologram-recording method of claim 13, wherein the content of the reactive molecule having an intrinsic birefringence is in a range of about 35 to about 65 wt % relative to the hologram-recording material.

* * * * *